United States Patent [19]

Loew et al.

[11] 3,773,701

[45]*Nov. 20, 1973

[54] PREPARATION OF POLYURETHANES

[75] Inventors: Frederic Christian Loew, Ridgewood; Edward Stone, Morris Plains, both of N.J.

[73] Assignee: Inmot Corporation, New York, N.Y.

[ * ] Notice: The portion of the term of this patent subsequent to Jan. 9, 1990, has been disclaimed.

[22] Filed: Mar. 2, 1972

[21] Appl. No.: 231,433

Related U.S. Application Data

[63] Continuation of Ser. No. 33,886, May 1, 1970, abandoned, and a continuation-in-part of Ser. No. 819,337, April 26, 1969, abandoned.

[52] U.S. Cl. ... 260/32.6 NR, 260/30.2, 260/30.4 N, 260/30.8 DS, 260/33.6 UB, 260/75 NE, 260/77.5 AA
[51] Int. Cl. .................. C08g 51/44, C08g 51/46
[58] Field of Search ................ 260/32.6 N, 77.5 SP, 260/77.5 AQ, 77.5 AM, 77.5 MA, 75 TN, 75 NH, 75 NQ, 75 NE, 77.5 AA

[56] References Cited
UNITED STATES PATENTS
2,929,800   3/1960   Hill ............................... 260/32.6 N
3,483,167   12/1969   Sommer ............................ 260/75

*Primary Examiner*—Allan Lieberman
*Assistant Examiner*—P. R. Michl
*Attorney*—Abner Sheffer et al.

[57] ABSTRACT

High molecular weight linear thermoplastic elastomeric polyurethanes of I.V. 0.9–2 are prepared by reaction in solution. A hydroxyl-terminated prepolymer and a diol chain extender are reacted, in the solvent, with a small excess of diisocyanate, until the —NCO content becomes constant, then a diol chain extender in amount equivalent to the remaining —NCO; reaction is continued, and then terminated after the high I.V. is attained.

14 Claims, No Drawings

PREPARATION OF POLYURETHANES

This is a continuation, of application Ser. No. 33,886 filed May 1, 1970, now abandoned.

This application is a continuation-in-part of our application Ser. No. 819,337 filed Apr. 26, 1969, now abandoned, whose entire disclosure is incorporated herein by reference.

One aspect of the invention relates to a process for the production of solutions of high molecular weight thermoplastic elestomeric polyurethanes, in which a mixture of a hydroxyl-terminated prepolymer, a diisocyanate and a diol is reacted in a solvent therefor. The mixture consists essentially of difunctional reactants and the isocyanate groups in the reaction mixture are present in the proportion of about 1.01 to 1.2 (e.g. 1.05 to 1.15) isocyanate group per active hydrogen-containing isocyanate-reactive group. The reaction is continued, in the solvent, until the isocyanate content reaches a constant level, as shown by analysis of a sample of the reaction mixture, for instance by titration with a 0.01N solution of n-dibutylamine in dry tetrahydrofuran. At this time there are substantially no unreacted hydroxyl groups in the reaction mixture. Then, in the later stage, an amount of diol chain extender sufficient to provide one alcoholic hydroxyl group for each unreacted isocyanate group, as determined by that analysis, is added; the ensuing reaction of the isocyanate and hydroxyl groups is continued at controlled temperature and the viscosity of the mixture is measured during this reaction until a viscosity corresponding to an intrinsic viscosity in the range of about 0.9 or 0.95 to 1.4, 1.6, 1.8 or even 2.0 is reached. At this time an end-capping reagent, such as an alcohol (e.g. methanol or butanediol) or other chain-terminating reactant is added to stop the reaction. This procedure provides a highly controllable way of producing a novel product of controlled, stable, very high molecular weight which is not further reactive with water or other isocyanate-reactive compounds under normal conditions.

The amount of diol chain extender supplied to the later stage is below 20 mol percent (e.g. in the range of about 5 to 15 mol percent) of the amount of chain extender present in the earlier stage.

In a particularly preferred form of the invention, the reaction of the diisocyanate and the hydroxyl-containing compounds in the solvent is carried out in the presence of a catalyst for the reaction of — NCO and alcoholic — OH which does not promote dimerization or trimerization of —NCO. Particularly suitable catalysts are stannous salts of carboxylic acids such as stannous octoate and covalently bonded tin compounds such as dibutyltin dilaurate. These are known catalysts for isocyanate-hydroxyl reactions; see "Polyurethanes Chemistry and Technology Part I. Chemistry" by Saunders and Frisch published 1962 by Interscience Publishers page 168 Table XXX items B and C for compounds of this type. It is found that in the presence of such catalysts the complete reaction can be carried out in the solvent in relatively short reaction times. It is also within the broader scope of the invention to carry out the reaction in the absence of added catalyst, particularly when higher temperatures are employed to increase the reaction rate.

A particularly preferred catalyst for use in the reaction is dibutyltin dilaurate. It is acidic in nature and, as shown by Saunders and Frisch (previously cited) gives a high rate of reaction in a solvent-free system at 70°C as indicated by a relatively short gelation time.

The proportion of catalyst present in the reaction mixture may be, for instance, within the range of about 0.001 to 1 percent (preferably about 0.01 to 0.05 percent) based on the total weight of the reactants.

The hydroxyl-terminated prepolymer preferably has a molecular weight below 6000 and above 300; for instance it may be in the range of about 400, or 800, to about 2,000 or 2,500. It may be a polyester of a hydroxycarboxylic acid (e.g. a polycaprolactone) or a polyester of a glycol and a dicarboxylic acid (e.g. ethylene glycol adipate or 1,4- butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about 3 to 6 carbon atoms in length. A prepolymer which provides flexible or "soft" segments in the polyurethane molecule is preferred.

The hydroxyl-terminated prepolymer may be a polyether. Typical polyethers which are used to provide the soft segments for elastomeric polyurethanes are usually of aliphatic character. One type has the formula H(RO)$_n$H where R is a divalent alkylene radical, such as tetramethylene or ethylene or propylene, and "n" denotes the degree of polymerization.

The preferred diisocyanate is diphenyl methane -p,p'-diisocyanate, but other diisocyanates may be used as such or in admixture therewith. Examples of other diisocyanates are 2,4-toluene diisocyanate, p,p'-diphenyl diisocyanate, bitolylene diisocyanate, tetramethylene diisocyanate, and 4,4'-dicyclohexylmethane diisocyanate. The most suitable diisocyanates have molecular weights below 500, usually below about 300.

The chain extender is preferably a low molecular weight glycol. A particularly preferred chain extender is tetramethylene glycol. Others are ethylene glycol, diethylene glycol, hexamethylene glycol or octamethylene glycol. Both hydroxyl groups of the glycol are preferably primary hydroxyls, and the glycol is preferably unbranched (having no branches such as dependent methyl or ethyl groups).

The nitrogen content of the polyester polyurethane is preferably in the range of 2 to 6 percent, most preferably about 4 to 5 percent, particularly for polyurethanes made with diphenylmethane-p,p'-diisocyanate.

One particularly suitable polyurethane is made, in solution in N,N-dimethyl formamide ("DMF"), from a polyester prepolymer of at least 1,500 molecular weight, the proportions of aromatic diisocyanate, polyester and chain extender being such that the high molecular weight polyrethane is insoluble in 10 percent concentration in tetrahydrofuran ("THF") at room temperature.

In another suitable polymer, particularly useful for the coating of fabrics, the proportions are such that the high molecular weight polyurethane is soluble in 20 percent concentration in THF at room temperature.

The reaction is preferably carried out without substantial addition or removal of solvent.

During the reaction the reaction mixture is preferably maintained at an elevated temperature, but preferably below 200°C, more preferably below the boiling temperature of the solvent at atmospheric pressure, e.g. below about 160°C, and above 30°C. It is preferred to operate at above 40°C; reaction temperatures of about 50°C, 60°C, 70°C, 80°C and 100°C have given very good results.

In one preferred aspect of the invention, in which the reaction is effected in DMF, the concentration of the reactants in the DMF is preferably such as to produce a polyurethane concentration in the range of about 15 to 40 or 45 percent, more preferably about 30 to 35 percent. The proportion of hydroxyl-terminated prepolymer is preferably in the range of about 40 to 60 percent, more preferably about 50 percent (e.g. 48–52 percent), of the total weight of the polyurethane, and the proportion of the diisocyanate is preferably in the range of about 35 to 45 percent, more preferably about 40 percent (e.g., 38–42 percent) of the total weight of the polyurethane.

In another preferred aspect of the invention, the reaction is effected in tetrahydrofuran ("THF") and the concentration of the reactants in the THF is preferably such as to produce a polyurethane concentration in the range of about 5 to 40 percent, more preferably about 15 to 25 percent. The proportion of hydroxyl-terminated prepolymer is preferably in the range of about 40 to 60 percent, more preferably about 45 to 55 percent, of the total weight of the polyurethane, and the proportion of the diisocyanate is preferably in the range of about 10 to 60 percent, more preferably about 30 to 45 percent of the total weight of the polyurethane.

Other solvents which may be employed include esters (e.g. isopropyl acetate, butylacetate, etc.); ketones (e.g. acetone, methyl ethyl ketone, cyclopentanone, cyclohexanone, etc.); ethers, including cyclic ethers such as 1,4-dioxane; amides (e.g. N,N-dimethylacetamide, N-methylpyrrolidone, tetramethylurea, etc.); sulfoxy compounds (e.g. dimethyl sulfoxide or sulfolane); aromatic hydrocarbons (e.g. benzene, tolueme, xylene, etc.); or mixtures of any of the above solvents.

As previously described, a chain extender is added after the isocyanate content has reached a constant level, (which indicates that the mixture contains substantially no unreacted hydroxyl groups). Best results have thus far been obtained by using a dihydric alcohol as the chain extender at this stage. It is within the broader scope of this invention, however, to employ other difunctional chain extenders at this stage, either alone or in admixture (e.g. in 1:1 molar ratio) with the diol. Examples of such materials are diamines, e.g. p,p'-diaminodiphenylmethane and aminoalcohols, e.g. aminoethanol.

The amount of chain terminator which is added after the reaction mixture has attained the desired molecular weight (as indicated, for instance, by the viscosity of the solution) is not narrowly critical. It should of course be at least sufficient to react with all the remaining —NCO groups but an excess (e.g. a 5 percent excess) may be used to make sure that the reaction is terminated effectively.

The following Examples are given to illustrate this invention more fully. In the Examples all pressures are atmospheric unless otherwise indicated. In the applications all proportions are by weight unless otherwise indicated.

EXAMPLE 1

To 770 parts of DMF are added (at room temperature) 205 parts Desmophen 2001 polyester (a hydroxyl-terminated polyester of 2,000 molecular weight, having a hydroxyl number of about 55.5 mg KOH per g, made from about 1 mol butane diol-1,4, 1.13 mol ethylene glycol and 2 mols adipic acid), 46.5 parts 1,4-butanediol, 0.01846 part p-toluenesulfonic acid, 0.1616 part dibutyl tin dilaurate and 171.6 parts diphenylmethane-p-p' diisocyanate. The solution is stirred and the unreacted isocyanate content determined by titration periodically. After the —NCO content has been stable for at least ½ hour, an amount of 1,4-butanediol to provide one alcoholic hydroxyl for each unreacted isocyanate group is added. This amount is in the range of about 3–5 parts (that is, in a series of eight successive runs under substantially the same conditions the amounts added, as determined from the NCO analysis, are 4.183, 3.063, 4.85, 4.631, 5.055, 4.939, 4.473 and 4.903 parts, respectively). After further reaction, and increase in the viscosity there is added 7.5 parts of a 50/50 w/w methanol/DMF mixture acting as a chain terminator to stop the reaction. The reaction mixture is thereafter (e.g. an hour after the addition of the chain terminator) discharged and cooled. During the process the exothermic reaction is moderated by cooling, so that the temperature is kept at about 50°C.

The final polymer contains 4.50 percent nitrogen and has an I.V. of 1.075; its polymer-solvent interaction parameter (K' in the Huggins equation) is 0.519. The solution has a total non-volatile content of 31.4 percent and a viscosity of 2,400 poises.

In this Example the —NCO content is measured after ¾ and 1½ hours of reaction and is found to be unchanged, whereupon the 3–5 parts of diol is added. After another 5½ hours of reaction the chain terminator is added.

Analysis of the DMF, before reaction, by vapor phase chromatography shows that it contains 0.34 ppm trimethylamine, 0.18 ppm dimethylamine, 0.61 ppm methanol and 0.75 ppm bis-(dimethylamino) methane.

The process is carried out under substantially anhydrous conditions. The reactor is predried by flushing dry nitrogen through it at 80°C and is then cooled under nitrogen to room temperature before the ingredients are charged thereto. The ingredients are added under a nitrogen blanket. The DMF is added first (after it has passed through a column of a molecular sieve for removal of traces of water); next the polyester, butanediol and catalyst are added in that order and the mixture is agitated for 15 minutes. The diisocyanate is then added while stirring and the reactor is sealed and the agitation is effected at a higher rate for the remainder of the reaction.

EXAMPLE 2

To 2398g of DMF in a stirred reactor are added (at room temperature) 531.5g of the Desmophen 2001 polyester, 123.6g of 1,4-butanediol, 0.096g of p-toluenesulfonic acid monhydrate, 0.222g of dibutyltin dilaurate and 448g of diphenylmethane-p, p'-diisocyanate. Prior to the addition of the diisocyanate the mixture is at 65.5°C; this temperature rises on such addition, reaching 88° in about 3 minutes and then declines reaching, some 10 minutes later, a temperature in the range of about 80°-82°C, which is maintained throughout the remainder of the run. Analyses for NCO content of the mixture (expressed in terms of per cent of the amount of NCO originally added) are taken as follows: 58 minutes (after addition of diisocyanate) 5.25 percent; 63 minutes, 5.27 percent; 72 minutes, 5.12 percent; 99 minutes, 5.10 percent; 104 minutes, 5.04 percent. Thus the —NCO content changes less than 0.1 percent between successive determinations and is substantially constant, from a practical point of view, with the very gradual drop in NCO content, considering the elevated reaction temperature and the experimental error, indicating that very little, if any, side reaction is occurring; to demonstrate this further, the mixture is held, at reaction temperature, until at 132 minutes (after addition of diisocyanate) the NCO is 4.91 percent of the amount of NCO originally added. At that time (132 minutes after addition of diisocyanate) there is added an amount of 1,4-butanediol stoichiometrically equivalent to this latter —NCO content, namely 7.94g butanediol. About 135 minutes after such addition, the reaction is terminated as in Example 1, by capping with butanediol -1,4. The final solution viscosity is 3110 poises (at 31.7 percent concentration, corresponding to a viscosity of about 3000 poises at 31.5 percent concentration) and the I.V. is 1.115. After 50 days of storage at room temperature there is very little drop in solution viscosity, the viscosity then being 2,800 poises.

In the foregoing Examples the initial mixing of the ingredients with the DMF prior to addition of the diisocyanate occurs within a relatively short time (e.g. less than a day and generally less than an hour prior to said addition) and the mixture is distinctly acidic prior to such addition.

EXAMPLE 3

To 79.96 parts of tetrahydrofuran ("THF") in a stirred reactor there are added 1.81 parts of 1,4-butanediol, 9.58 parts of molten hydroxyl-terminated polycaprolactone ("Niax Polyol D520", having a melting point in the range of 35° to 45° C. and a molecular weight of 850, and then 8.40 parts of diphenylmethane-p,p'-diisocyanate. After thorough mixing 0.01 part of dibutyltin dilaurate is added (as a 20 percent solution in THF). The reaction is carried out under anhydrous conditions under a nitrogen blanket. The temperature rises, due to the exothermic reaction, and the mixture is further heated to maintain the reaction mixture under reflux (at about 65°C). Analyses for —NCO content are made and, after about 4 to 5 hours of reaction under reflux the —NCO content becomes substantially constant and 0.202 part of 1,4- butanediol, an amount stoichiometrically equivalent to the excess —NCO, is added. The viscosity of the solution increases and when the viscosity of the solution reaches 35 poises (measured at 25°C with a Brookfield viscometer) the reaction is terminated by adding 0.02 part of 1,4-butanediol, and the mixture is cooled, over a two hour period, to a temperature of about 50°C; the viscosity, after cooling and standing overnight, is 54 poises (measured as above, at 25°C) and the intrinsic viscosity is 1.02.

EXAMPLE 4

Example 3 is repeated except that the reaction is continued until the Brookfield viscosity, measured at 25°C, reaches 100 to 120 poises before the chain-terminating addition of butanediol.

EXAMPLE 5

Example 3 is repeated, using, as the polyester, a hydroxyl-terminated polycaprolactone ("Niax D 540") whose molecular weight is 1250, the relative molar proportions of the initial reactants added to the THF being 1.8922 butanediol, 0.8966 polyester (based on 1250 molecular weight) and 3.0 diisocyanate. The reaction is continued for a sufficient period of time, before termination, to produce a final polyurethane solution having a Brookfield viscosity (measured at 25°C) of 296 poises at a polyurethane concentration of 20.8 percent. The I.V. of the polyurethane is 1.394.

The intrinsic viscosity ("I.V.") is determined in highly dilute solution in analytical grade DMF which has been thoroughly dried by storage under a nitrogen atmosphere over a molecular sieve (Linde 5A). Four measurements at 25°C corresponding to four, approximately equally spaced, concentrations are made, and intrinsic viscosity and polymer-solvent interaction parameter are determined by the Huggins equation:

$$\eta sp/C = [\eta] + K' [\eta]^2 C$$

where $\eta sp$ is the specific viscosity and C is concentration expressed in g/100 ml, and $[\eta]$ is the intrinsic viscosity.

It is understood that the foregoing detailed description may be made therein without departing from the spirit of the invention. The "Abstract" given above is merely for the convenience of technical searchers and is not to be given any weight with respect to the scope of the invention.

We claim:

1. Process for the production of solutions of high molecular weight thermoplastic elastomeric polyurethanes, which comprises reacting a mixture of a hydroxyl terminated prepolymer having a molecular weight of 400 to 2,500, a diisocyanate having a molecular weight below 500 and a diol having up to 8 carbon atoms, in a solvent therefor, said mixture consisting essentially of difunctional reactants, the isocyanate groups in said reaction mixture being present in the proportion of about 1.05 to 1.2 isocyanate group per active hydrogen-containing isocyanate-reactive group, continuing said reaction until substantially all said active hydrogen-containing groups have reacted, as evidenced by a substantially constant isocyanate content on analysis, adding to the reaction mixture a difunctional reagent having only two functional groups in an amount equal stoichiometrically to said analytically determined substantially constant isocyanate content, and continuing the reaction in solution until the intrinsic viscosity of the dissolved polymer is in the range of 0.9 to 2 (measured in dimethylformamide at 25°C) and terminating the reaction by adding an isocyanate-reactive and capping reagent in amount at least sufficient to react with all the remaining —NCO groups, the proportions being such that the amount of said added difunctional reagent is below 20 mol percent of the amount of said diol, said added difunctional reagent having up to 13 carbon atoms and being a diol, diamine or monoamino monoalcohol, and the concentration of the reactants, and the resulting polyurethane, in the solvent being in the range of about 5 to 45 percent, the proportions of the reactants being such that a polymer soluble in said solvent is obtained.

2. Process as in claim 1 in which said added difunctional reagent is a glycol.

3. Process as in claim 1 in which said reaction is carried out in dimethylformamide.

4. Process as in claim 1 in which said reaction is carried out in tetrahydrofuran.

5. Process as in claim 1 in which said diisocyanate consists of a hydrocarbon having two —NCO substituents.

6. Process as in claim 1 in which said reaction is carried out in dimethylformamide, and said concentration is about 30 to 35 percent.

7. Process as in claim 1 in which said reaction is carried out in tetrahydrofuran and said concentration is about 15 to 25 percent.

8. Process as in claim 1 in which said added difunctional reagent is a glycol, said diisocyanate is aromatic, and said proportion of isocyanate group per active hydrogen containing isocyanate-reactive group is 1.05 to 1.15.

9. Process as in claim 8 in which the proportion of said hydroxyl-terminated prepolymer is about 50 percent of the total weight of the polyurethane and the proportion of diisocyanate is about 40 percent of the total weight of the polyurethane, said prepolymer is polycaprolactone or butanediol adipate, and said reaction is carried out in an amount of dimethylformamide such that the polyurethane concentration is about 30 to 35 percent.

10. Process as in claim 9 in which said added difunctional reagent is selected from the group consisting of ethylene glycol, tetramethylene glycol, diethylene glycol, hexamethylene glycol and octamethylene glycol.

11. Process as in claim 9 in which the proportion of said hydroxyl-terminated prepolymer is about 45 to 55 percent of the total weight of the polyurethane, the proportion of diisocyanate is about 30 to 45 percent of the total weight of the polyurethane, said prepolymer is polycaprolactone or butanediol adipate, and said reaction is carried out in an amount of tetrahydrofuran such that the polyurethane concentration is about 15 to 25 percent.

12. Process as in claim 10 in which the diisocyanate is diphenylmethane -p,p'-diisocyanate.

13. Process as in claim 11 in which the diisocyanate is diphenylmethane-p,p'-diisocyanate.

14. Process as in claim 9 in which said added difunctional reagent is a glycol selected from the group consisting of ethylene glycol, tetramethylene glycol, diethylene glycol, hexamethylene glycol and octamethylene glycol.

* * * * *

UNITED STATES PATENT OFFICE
CERTIFICATE OF CORRECTION

Patent No. 3,773,701                    Dated  Nov. 20, 1973

Inventor(s) Frederic Christian Loew, Edward Stone

It is certified that error appears in the above-identified patent and that said Letters Patent are hereby corrected as shown below:

In the heading, "Inmot Corporation" should read ---

Inmont Corporation ---.

Column 1, line 10, "elestomeric" should read --- elastomeric ---

Column 2, line 63, "polyrethane" should read --- polyurethane ---

Signed and sealed this 23rd day of April 1974.

(SEAL)
Attest:

EDWARD M.FLETCHER,JR.                    C. MARSHALL DANN
Attesting Officer                        Commissioner of Patents